(12) United States Patent
Fang

(10) Patent No.: US 6,626,057 B1
(45) Date of Patent: Sep. 30, 2003

(54) GEAR-SHIFTING DEVICE FOR CHANGING SCANNING SPEED OF OPTICAL SCANNER

(75) Inventor: Po-Hua Fang, Taipei Hsien (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/566,023

(22) Filed: May 8, 2000

(51) Int. Cl.[7] ................................................. F16H 3/34
(52) U.S. Cl. ...................................................... 74/354
(58) Field of Search .......................... 74/353, 354, 393, 74/396; 358/412, 497

(56) References Cited

U.S. PATENT DOCUMENTS

| | | | | | |
|---|---|---|---|---|---|
| 3,229,540 | A | * | 1/1966 | Baranowski, Jr. ............. | 74/354 |
| 3,739,817 | A | * | 6/1973 | Kunz ........................ | 74/353 X |
| 4,573,723 | A | * | 3/1986 | Morita et al. ............. | 74/354 X |
| 4,760,751 | A | * | 8/1988 | Kasamatsu ................. | 74/354 |
| 5,020,386 | A | * | 6/1991 | Taig ......................... | 74/384 |
| 5,740,696 | A | * | 4/1998 | Jean et al. ................. | 74/397 X |
| 6,070,482 | A | * | 6/2000 | Kugio et al. .................. | 74/354 |
| 6,244,124 | B1 | * | 6/2001 | Lee .............................. | 74/354 |

* cited by examiner

Primary Examiner—Charles A Marmor
Assistant Examiner—Roger Pang
(74) Attorney, Agent, or Firm—J.C. Patents

(57) ABSTRACT

A speed-changing gear set inside the drive system of a scanner, wherein the drive system has a driving motor and an output unit. The speed-changing gear set has a control element and a cam driven by the control element. The cam has a first set of gears fastened to the cam such that one of the gears in the first group engages with a gear on the output unit. An axle is in contact with the cam such that movement of the cam produces a shift in the position of the axle. The axle has a second set of gears mounted on the axle. When the cam stops at a first designated position, one of the gears in the first set of gears meshes with the driving motor so that the output unit is driven. When the cam stops at a second designated position and shifts the position of the axle, gears in the second group mesh with the gear on the driving motor and a gear in the first group, respectively. The output unit is thus driven by the driving motor through the gear train that has the first set of gears and the second set of gears.

12 Claims, 6 Drawing Sheets

GEAR-SHIFTING DEVICE FOR CHANGING SCANNING SPEED OF OPTICAL SCANNER

BACKGROUND OF THE INVENTION

1. Field of Invention

The present invention relates to the mechanical driving system of an optical scanner. More particularly, the present invention relates to a gear-shifting device for changing the scanning speed of an optical scanner.

2. Description of Related Art

An optical scanner is one of the most frequently used computer peripheral devices. By converting an optical image into digital data, the scanner is able to store the image in a digital format that can be readily modified on demand. Data is extracted from an object image by projecting a beam of light from a light source to the object image. Upon reflection from the object image, the light passes through a set of optical lenses. Ultimately, the light is intercepted by a charge-coupled device (CCD) and converted into digital signals. In general, the resolution of an optical scanner depends on the level of integration and sensitivity of the CCD. However, the resolution of an optical scanner is also closely related to the scanning mechanism of the scanner. A platform type scanner typically includes a charge-coupled device (CCD) and a drive system. The scanner is usually driven by a stepping motor. The CCD can be attached to the drive system so that scanning is carried out directly. Alternatively, the CCD can be fixed in position while a group of optical lenses is attached to the drive system so that a scanning light beam is transmitted to the fixed CCD after passing through the group of optical lenses. In general, the CCD is able to read a scanning line (also known as a horizontal line) of image data in each scanning interval with each scanning line consisting of a plurality of pixels. Resolution, also known as horizontal resolution or optical resolution, of each scanning line depends on the density of sensors in the CCD. Scanning is carried out vertically through the CCD directly attached to the drive system or the group of optical lenses attached to the drive system. Vertical resolution, also known as motor resolution, is related to the stepping angle of the stepper motor and precision of the drive system. Through vertical scanning, a plurality of lines of image data are formed. The data from all these image lines can be combined to form a complete image.

FIG. 1 is a schematic diagram showing the drive system of a conventional optical scanner. The drive system of an optical scanner generally includes a drive motor 100 such as a stepper motor. Power transmission components 102 such as gears, screw rods or a leather belt are also employed to drive an output unit 104 such as a CCD or a group of optical lenses. Hence, the optical scanner is able to capture data line by line. For practical reasons, the optical scanner must be able to provide different scanning resolutions. However, the power transmission components 102 of most conventional optical scanners have only one set of gears and hence provide only one gear ratio. Hence, it is impossible to select between a rapid scan and a high-resolution scan.

SUMMARY OF THE INVENTION

Accordingly, one object of the present invention is to provide a speed-changing gear set for an optical scanner so that the driving system can have two or more gear ratios to perform high speed scanning or high resolution scanning.

To achieve these and other advantages and in accordance with the purpose of the invention, as embodied and broadly described herein, the invention provides a speed-changing gear set installed within a driving system of an optical scanner. The gear set includes a control element, a cam, an axle, a first set of gears and a second set of gears. The cam is connected to the control element. The cam is able to rotate when driven by the control element. The first set of gears is mounted on the cam and coupled to the output unit of the driving system. The axle is attached to the cam so that the axle is able to shift position when the cam is rotated. The second set of gears is mounted on the axle. When the cam is driven to a first position, the first set of gears engages directly with a gear on the driving motor, thereby driving the output unit. On the other hand, when the cam is driven to a second position, the axle shifts to another position such that the second set of gears engages with the gear on the driving motor and the first set of gears. Hence, the output unit is driven by the driving motor via the first and second set of gears.

According to one embodiment of this invention, the control element is a control motor. The cam has a gear section and a curve section. The gear section engages with a gear on the control motor. The first set of gears includes a first gear, a second gear and a third gear. The first gear and the cam are on the same axial. The first gear engages with the gear at the output unit. The second gear is mounted on an axle that is inserted into the cam and hence follows the movement of the cam. The second gear and the third gear are coaxial. The second and the third gear are fixed next to each other so that they rotate in step together. The third gear engages with the first gear. The axle cuts across the curve surface section of the cam. In addition, an elastic device pushes the axle against the curve surface in a direction toward the center of the cam so that the axle can slide along the curve contour of the cam when the cam rotates. The second set of gears includes a fourth gear and a fifth gear both mounted on the same axle. The fourth gear and the fifth gear are joined together so that they move in step together.

When the control motor drives the cam to a designated first position, the axle will be on the first position of the cam surface, while the second gear will engage with the gear on the driving motor. Force is transmitted from the driving motor through the second gear, the third gear and the first gear to the output unit.

When the control motor drives the cam to a designated second position, the axle will be on the second position of the cam surface. Hence, the fifth gear meshes with the gear on the driving motor, while the fourth gear meshes with the second gear. Force is transmitted from the driving motor through the fifth gear, the fourth gear, the second gear and the first gear to the output unit. In this embodiment, the range of cam movements is limited by two stopping blocks.

The speed changing gear set of this invention can provide at least two gear ratios. Hence, a high resolution but slow speed scanning can be executed to obtain an accurate image. On the other hand, by shifting the cam to a higher gear ratio, a lower resolution is obtained, but scanning is completed in a shorter period. Therefore, performance capacity of the optical scanner improves.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
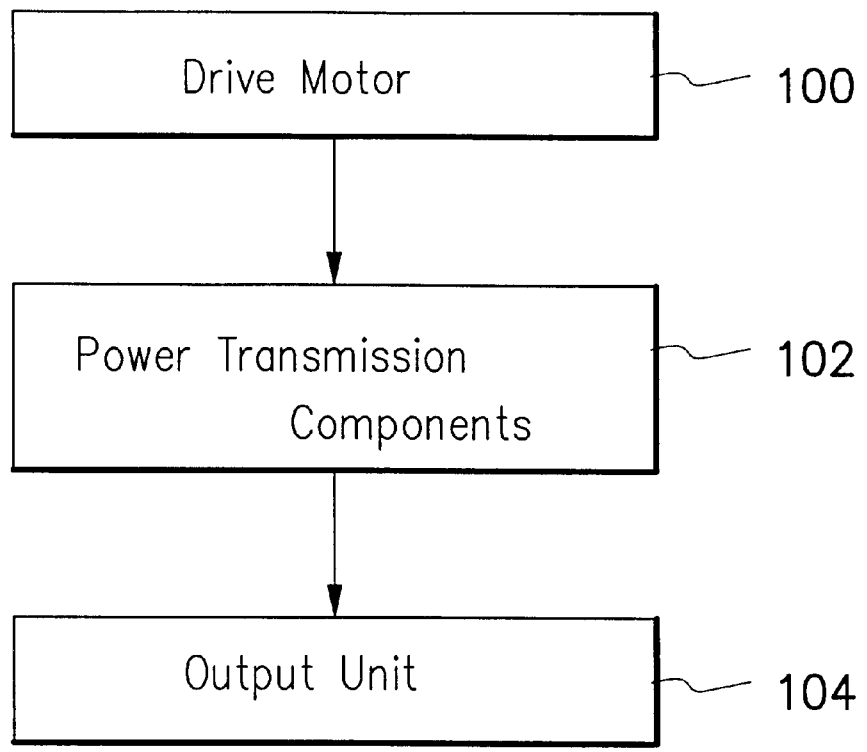
FIG. 1 is a schematic diagram showing the drive system of a conventional optical scanner.

Reference will now be made in detail to the present preferred embodiments of the invention, examples of which are illustrated in the accompanying drawings. Wherever possible, the same reference numbers are used in the drawings and the description to refer to the same or like parts.

Figure 2:
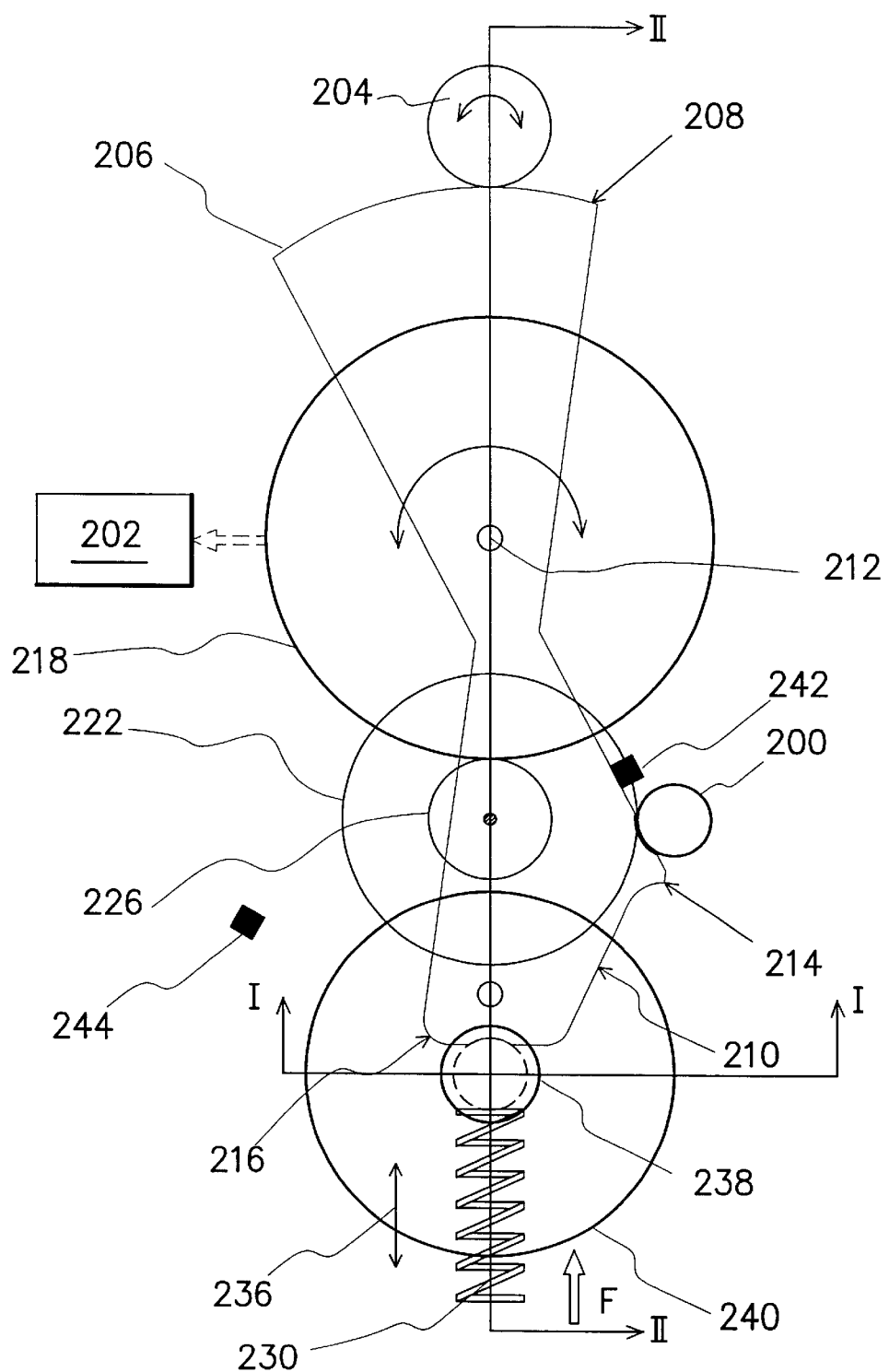
FIG. 2 is a sketch showing a gear system for changing the scanning speed of an optical scanner according to one preferred embodiment of this invention.
Figure 3:
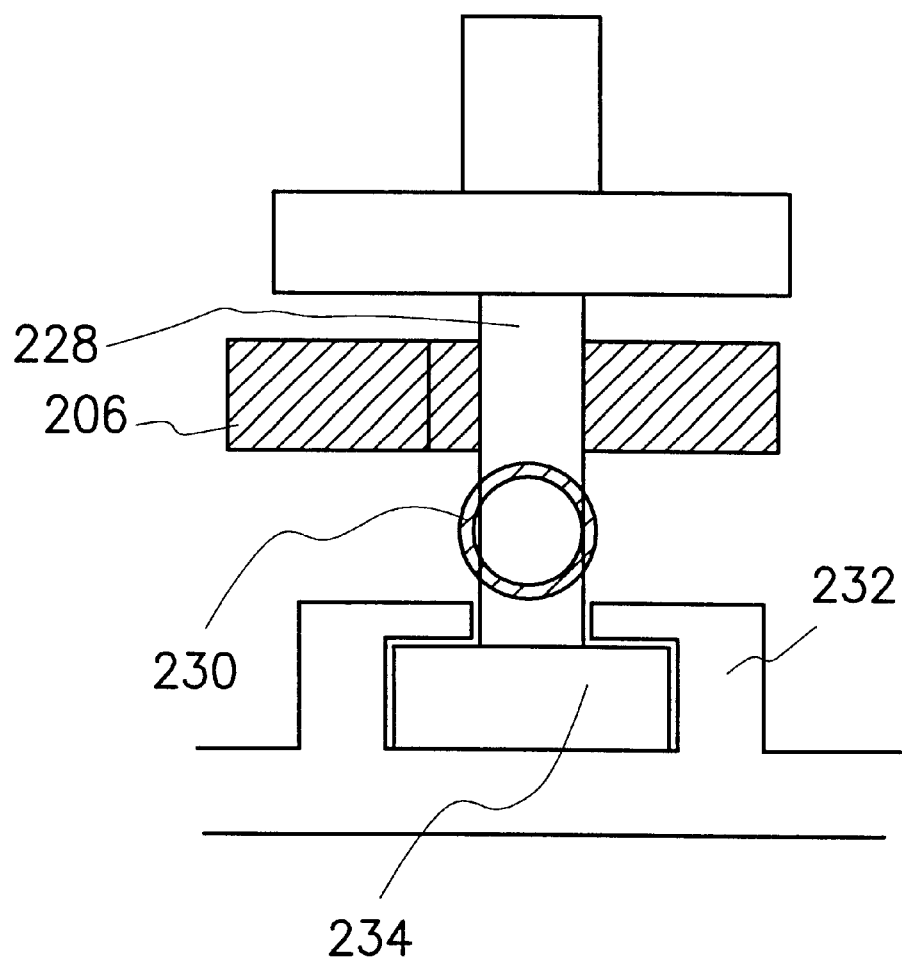
FIG. 3 is a cross-sectional view along line I—I of FIG. 2.
Figure 4:
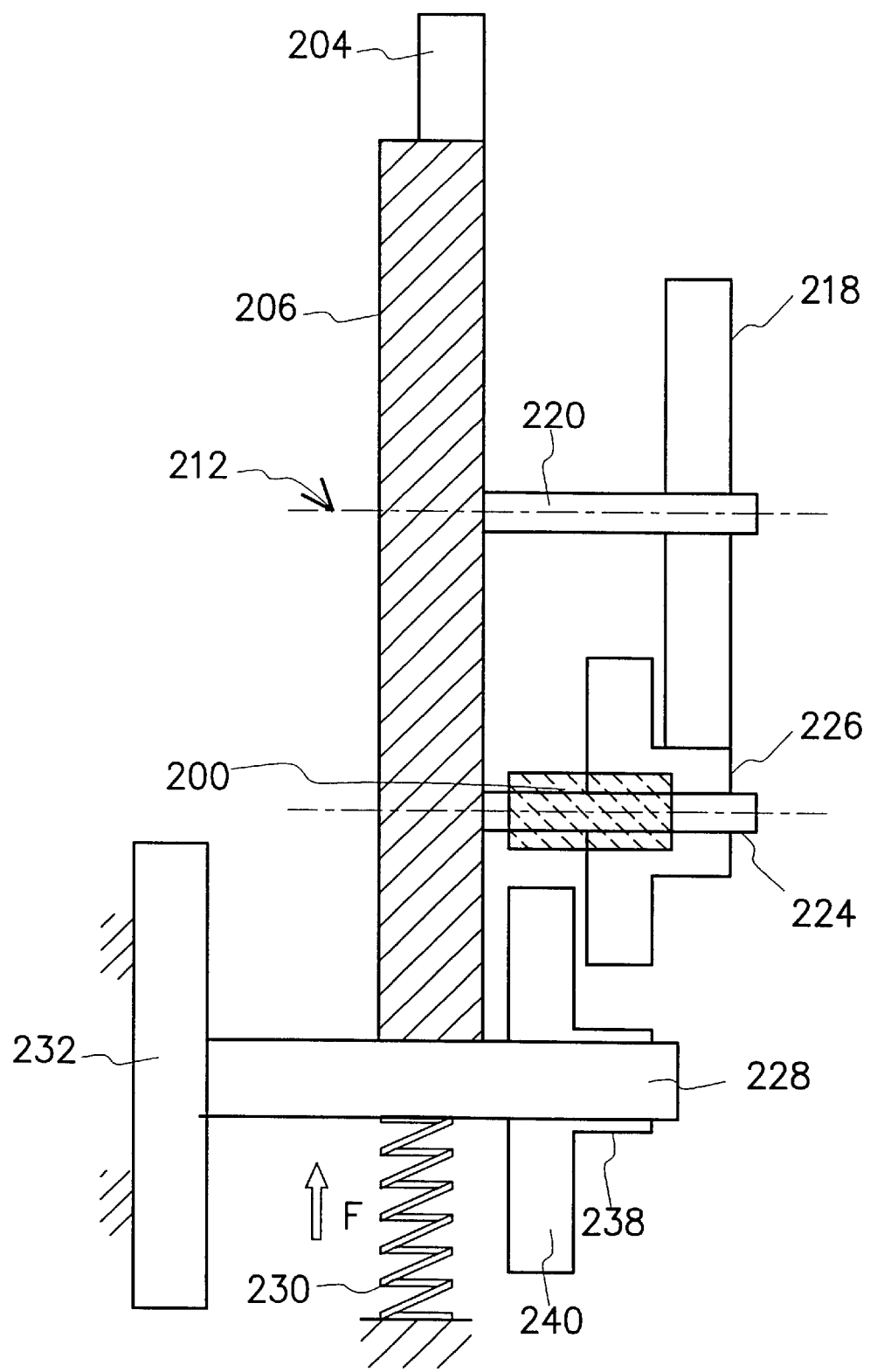
FIG. 4 is a cross-sectional view along line II—II of FIG. 2.

FIG. 2 is a sketch showing a gear system for changing the scanning speed of an optical scanner according to one preferred embodiment of this invention. FIG. 3 is a cross-sectional view along line I—I of FIG. 2, and FIG. 4 is a cross-sectional view along line II—II of FIG. 2. The speed-changing gear set of this invention is incorporated with the drive system of the scanner. In general, the drive system includes a driving motor 200 and an output unit 202. The driving motor 200 can be, for example, a stepper motor or a direct current motor, and the output unit 202 can be, for example, a gear wheel, a worm rod or a leather belt.

Figure 5:
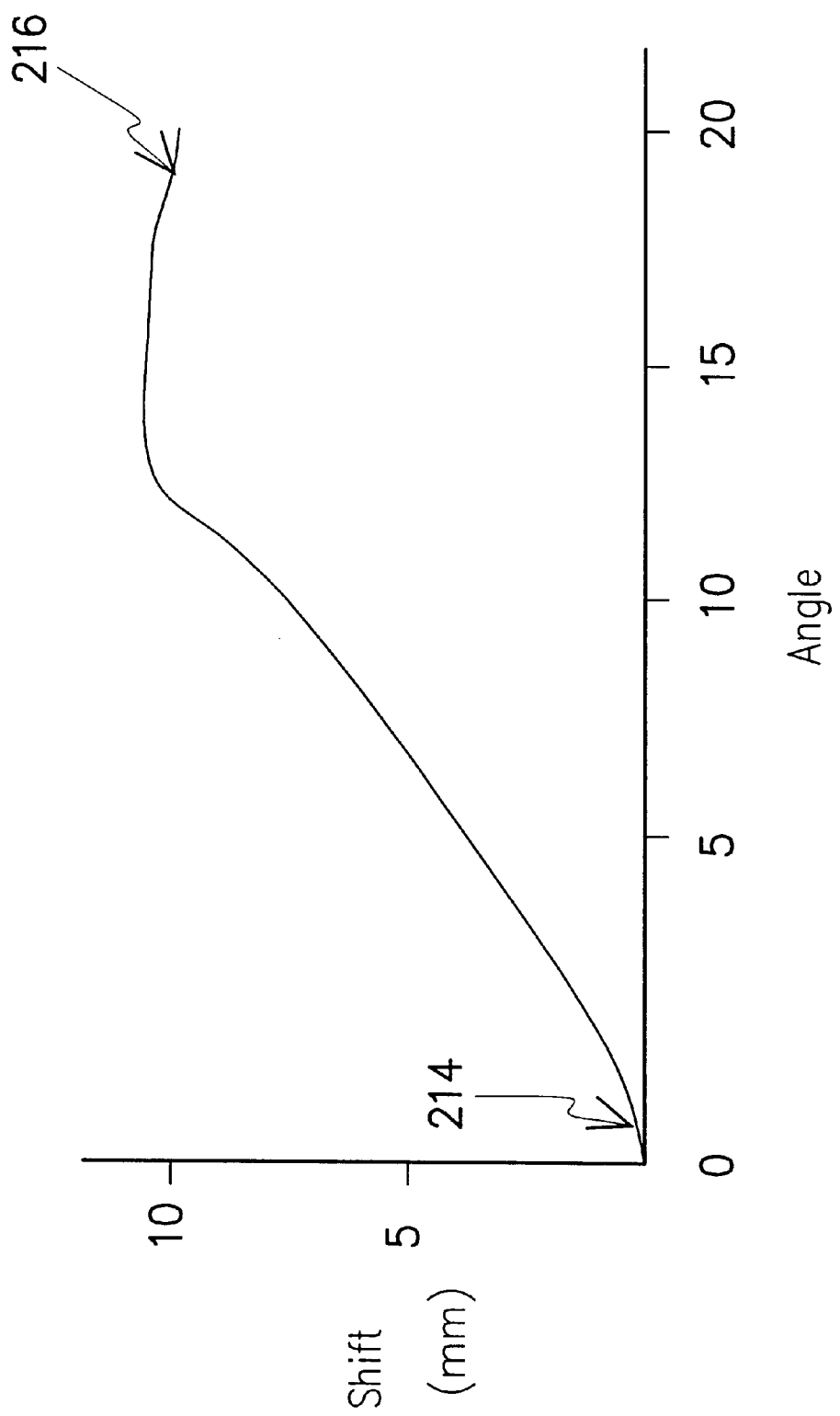
FIG. 5 is a graph showing the shift in position of the curved portion of the cam surface versus cam angle corresponding to the structure shown in FIG. 2.

The speed changing gear set of this invention has a control element 204, such as a control motor. According to user-demanded resolution or speed requirements, the control element 204 can be activated to change the scanning speed. The gear set also includes a cam 206 having a gear-teeth section 208 and a curve section 210. The gear section 208 of the cam 206 is engaged with the control element 204 so that the cam 206 can be driven into a rocking motion by the control element 204. Distance from the curve surface 210 to the center 212 of the cam 206 changes with the angle of movement. This provides a mechanism for speed changing. FIG. 5 is a graph showing the shift in position of the curved portion of the cam surface versus cam angle corresponding to the structure shown in FIG. 2. In FIG. 2, label 214 indicates that the cam 206 is at a 0° angle (the second position), and label 216 indicates that the cam 206 has moved to a 20° angle (the first position).

As shown in FIG. 2, the gear set also includes five gears, three axles and an elastic device. The gears of the gear set include a first gear 218, a second gear 222, a third gear 226, a fourth gear 238 and a fifth gear 240. The axles of the gear set include axles 220, 224 and 228. The first gear 218 and the cam 206 are coaxial. In other words, the first gear 218 slides into the axle 220. Preferably, a bearing (not shown) is inserted between the first gear 218 and the axle 220. The first gear 218 is coupled with the output unit 202. The second gear 222 slides into the axle 224. Meanwhile, the axle 224 is inserted into the cam 206. Hence, the second gear 222 is able to rock when the cam 206 is driven. The third gear 226 slides into the axle 224. The third gear 226 and the second gear 222 are joined so that the third gear 226 and the second gear 222 move together in synchrony. In other words, the second gear 222 and the third gear 226 have the same angular movement and angular velocity. The third gear 226 is engaged with the first gear 218. The second gear 222 and the third gear 226 can be joined by applying some glue or by screwing them together. Alternatively, the second gear 222 and the third gear 226 can be molded into one piece. In addition, both the second gear 222 and the third gear 226 can be fixed onto the axle 224 using key and slot. The axle 224 is free to rotate because the axle 224 and the cam 206 are joined using a bearing. The first gear 218, the second gear 222 and the third gear 226 together constitute a first set of gears.

A portion of the axle 228 is in contact with the curve section 210 of the cam 206. The axle 228 is also in contact with an elastic device 230 such as a spring. The elastic device 230 provides a force F on the axle 228 toward the center 212 so that the axle 228 has to slide along the curve surface 210 of the cam 206. Consequently, there will be a corresponding shift in position of the axle 228 along a vertical direction (label 236) when the cam rotates to a different angle. To limit the movement of the axle 228 to the vertical direction, a rail 232 can be used as shown in FIG. 3. One end of the axle 228 is attached to a guide block 234. The guide block 234 is placed inside the rail so that the axle 228 can only slide along the axial direction of the rail 232.

The fourth gear 238 and the fifth gear 240 slide into the axle 228. In addition, the fourth gear 238 and the fifth gear 240 are joined together so that both gears rotate in synchrony. The fourth gear 238 and the fifth gear 240 can be joined by applying some glue or by screwing them together. Alternatively, the fourth gear 238 and the fifth gear 240 can be molded into one piece. Preferably, the fourth gear 238 and the fifth gear 240 join the axle 228 indirectly through a bearing. The fourth gear 238 and the fifth gear 240 together constitute a second set of gears. Hence, the axle 228, along with the second set of gears, will be raised or lowered according to the direction of movement of the cam 206.

In addition, the gear set also includes two stopping blocks 242 and 244 for limiting the range the cam 206 can rotate.

Figure 6:
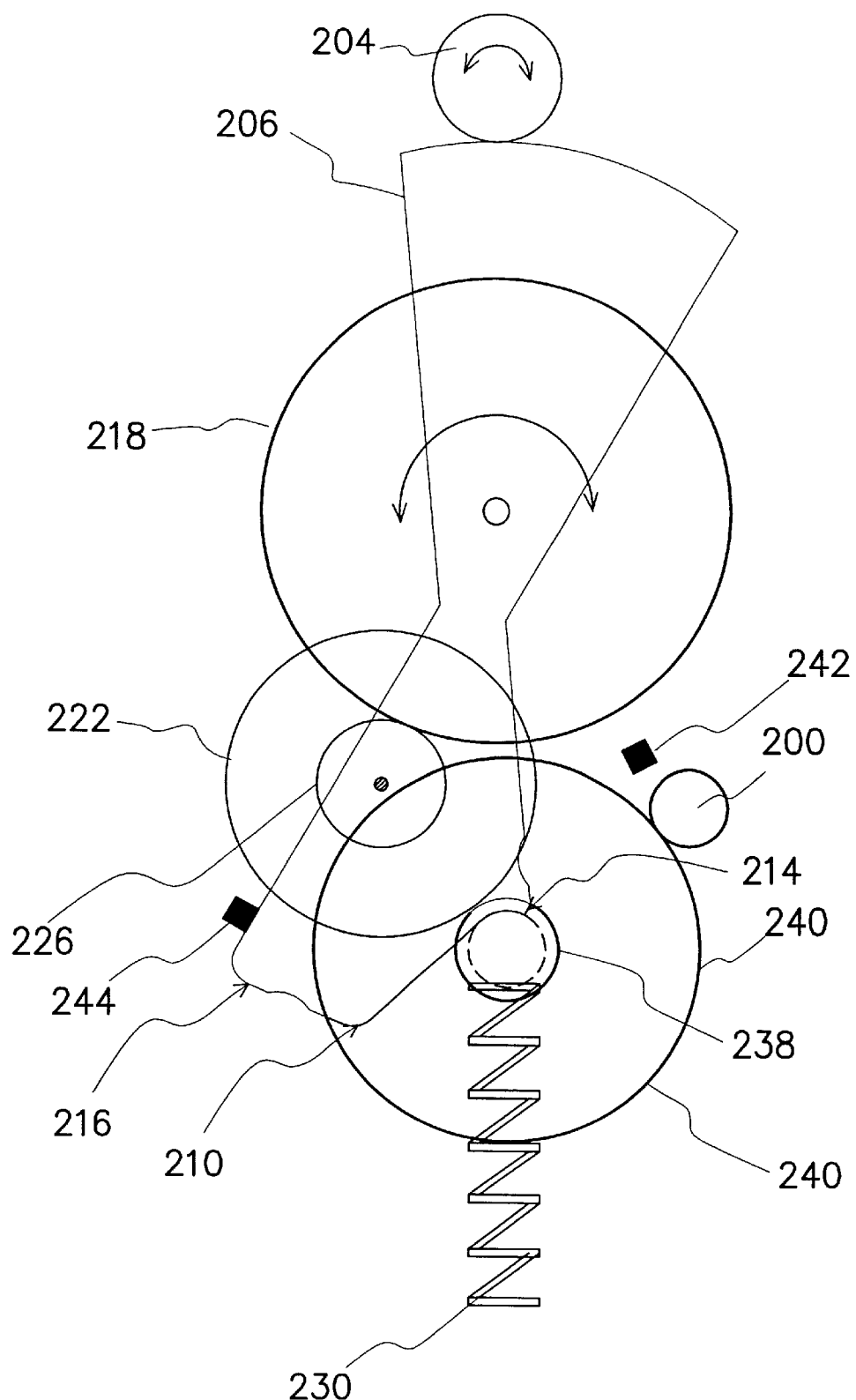
FIG. 6 is a sketch showing the gear system of FIG. 2 operating at another gear ratio.

FIG. 2 is a sketch showing the gear system operating at a first gear ratio. On the other hand, FIG. 6 is a sketch showing the gear system of this invention operating at another gear ratio. In FIG. 2, the location of the cam 206 for performing a lower resolution scan or a high speed scan is shown. The control motor 204 is activated to rotate the cam 206 until it touches the first stopping block 242. The axle 228 is pushed to the first position 216 by the curve section 210 of the cam 206. Lead by the movement of the axle 228, the fourth gear 238 and the fifth gear 240 are disengaged from any other gears. In the meantime, the second gear 222 and the third gear 226 follow the movement of the cam 206. The second gear 222 engages with the gears on the gear-shaft of the driving motor 200. Hence, the second gear 222, the third gear 226 and the first gear 218 are set in motion by the motor 200 to drive the output unit 202, while the fourth gear 238 and the fifth gear 240 remain idle.

When the scanner needs to perform a high resolution or a low speed scanning, the control motor 204 is activated to move the cam 206 until it touches the stopping block 244, as shown in FIG. 6. Due to the restorative action of the elastic device 230 on the axle 228, the axle 228 rises to the second position 214. The fourth gear 238 and the fifth gear 240 follow the movement of the axle 228, while the second gear 222 and the third gear 226 follow the movement of the cam 206. The fifth gear 240 engages with the gears on the gear-shaft of the drive motor 200, and the fourth gear 238 engages with the second gear 222. Hence, the fifth gear 240, the fourth gear 238, the second gear 222, the third gear 226 and the first gear 218 are set in motion by the motor 200 to drive the output unit 202.

For example, assume that the number of teeth in each gear is as follows:

| | |
|---|---|
| No. of gears on the driving motor 200: | 15; |
| No. of gears on the first gear 218: | 90; |
| No. of gears on the second gear 222: | 60; |
| No. of gears on the third gear 226: | 25; |
| No. of gears on the fourth gear 238: | 20; |
| No. of gears on the fifth gear 240: | 75; |

When the cam 206 touches the first stopping block 242, the gear ratio is:

$$\frac{60}{15} \times \frac{90}{25} = 14.4;$$

On the other hand, when the cam 206 touches the second stopping block 244, the gear ratio is changed to:

$$\frac{75}{15} \times \frac{60}{20} \times \frac{90}{25} = 54$$

Although two groups of gears are used to provide two gear ratios in the aforementioned embodiment, a cam having a multiple of designated positions for meshing with different gear groups and axles is also possible. By shifting the cam to various designated locations, the gear on the driving motor in turn can engage with each gear group. Moreover, a portion of the gears among the gear groups can be engaged together to obtain a series of gear speeds. Hence, the scanner is able to provide a greater selection of scanning speeds or resolution choices. In fact, the speed-changing gear set of this invention can be applied to other transmission systems.

In summary, the speed changing gear set of this invention provides more than one scanning speed or resolution. Hence, high-resolution and high-speed scanning is obtained, and performance capacity of the optical scanner is expanded.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A speed-changing gear set inside a drive system of a scanner wherein the drive system further includes a drive motor and an output unit, and the speed-changing gear set comprises:

a control motor;

a cam having a gear section and a curve surface section, wherein the gear section engages with a gear on the driving motor, and the curve surface section has a first position and a second position;

a first gear on the same axle holding the cam, wherein the first gear couples with the output unit;

a second gear coupled to the cam so that the second gear tracks the movement of the cam;

a third gear mounted on the second gear having the same axle as the second gear so that the second and the third gear rotate synchronously, and the third gear engages with the first gear;

an axle crossing over the curve surface section of the cam, wherein an elastic device pushes the axle against the cam surface in a direction toward the cam center so that the axle is able to slide along the curve surface of the cam when the cam moves;

a fourth gear and a fifth gear joined together and mounted on the axle so that the fourth and the fifth gear move in synchrony; and a first stopping block and a second stopping block for limiting the moving range of the cam, wherein if the cam is driven by the control motor to stop at the first stopping block position, the axle touches the first position on the curve surface of the cam, the second gear meshes with the gear on the driving motor, and the output unit is driven by the driving motor through the gear train that includes the second gear, the third gear and the first gear; and if the cam is driven by the control motor to stop at the second stopping block position, the axle touches the second position on the curve surface of the cam, the fifth gear meshes with the gear on the driving motor and the fourth gear meshes with the second gear, and the output unit is now driven by the driving motor through the gear train that includes the fifth gear, the fourth gear, the second gear, the third gear and the first gear.

2. The speed-changing gear set of claim 1, wherein the gear set further includes a track for limiting the direction of axle movement when one end of the axle is inserted into a block housed inside the track.

3. The speed-changing gear set of claim 1, wherein the gear set has a gear ratio of between 10 to 20 when the cam is stopped by the first stopping block.

4. The speed-changing gear set of claim 1, wherein the gear set has a gear ratio of between 50 to 60 when the cam is stopped by the second stopping block.

5. A speed-changing gear set inside a drive system of a scanner, wherein the drive system further includes a driving motor and an output unit, and the speed-changing gear set comprises:

a control element;

a cam driven by the control element, wherein the cam includes a first set of gears fastened to the cam such that one of the gears in the first set of gears couples with the output unit; and an axle in contact with the cam such that movement of the cam produces a shift in position of the axle, wherein the axle includes a second set of gears mounted on the axle, wherein if the cam stops at a first designated position, one of the gears in the first set of gears meshes with a gear on the driving motor so that the output unit is driven; and if the cam stops at a second designated position so that position of the axle is shifted, gears in the second set of gears mesh with the gear on the driving motor and one of the gears in the first set of gears, respectively, so that the output unit is driven by the driving motor through a gear train that includes the first set of gears and the second set of gears.

6. The speed-changing gear set of claim 5, wherein the gear set includes two stopping blocks for limiting the range of movement of the cam.

7. The speed-changing gear set of claim 5, wherein the gear set includes an elastic device for exerting a force on the axle toward the center of the cam so that the cam and the axle are in contact.

8. The speed-changing gear set of claim 5, wherein the axle in the gear set is attached to a guiding device for limiting the direction of movement of the axle.

9. The speed-changing gear set of claim 5, wherein the control element includes a motor.

10. The speed-changing gear set of claim 5, wherein the gears in the first set of gears are capable of providing a gear ratio of between 10 to 20.

11. The speed-changing gear set of claim 5, wherein the meshed gears between the gears in the first group and the second group are capable of providing a gear ratio of between 50 to 60.

12. A speed-changing gear set inside a drive system of a scanner, wherein the drive system further includes a driving motor and an output unit, and the speed-changing gear set comprises:

a control element;

a cam driven by the control element, wherein the control element drives the cam to a plurality of designated positions;

at least one axle in contact with the cam so that a cam movement causes a slide of the axle position; and a plurality of gear sets mounted on the cam and the axle, wherein a gear in one of the gear sets engages with a gear on the output unit;

wherein if the cam is driven to a particularly designated first position, the axle shifts by sliding at a position so that one of the gears in one of the gear sets meshes with a gear on the driving motor while the gears in other gear sets may mesh with each other so that the output unit is driven with a first gear ratio, and a second gear ratio is obtained whenever the cam moves to a second position.

* * * * *